US010582233B2

(12) United States Patent
Hurst

(10) Patent No.: US 10,582,233 B2
(45) Date of Patent: *Mar. 3, 2020

(54) SYSTEMS AND METHODS TO PROVIDE TRICK PLAY DURING STREAMING PLAYBACK

(71) Applicant: DISH Technologies L.L.C., Englewood, CO (US)

(72) Inventor: Mark B. Hurst, Cedar Hills, UT (US)

(73) Assignee: DISH Technologies L.L.C., Englewood, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/107,733

(22) Filed: Aug. 21, 2018

(65) Prior Publication Data

US 2018/0359505 A1 Dec. 13, 2018

Related U.S. Application Data

(63) Continuation of application No. 15/355,849, filed on Nov. 18, 2016, now Pat. No. 10,075,744, which is a continuation of application No. 13/027,220, filed on Feb. 14, 2011, now Pat. No. 9,510,029.

(60) Provisional application No. 61/303,579, filed on Feb. 11, 2010.

(51) Int. Cl.
*H04N 21/2343* (2011.01)
*H04N 21/2387* (2011.01)
*H04N 21/6587* (2011.01)
*H04N 5/765* (2006.01)
*H04N 5/783* (2006.01)
*H04N 21/472* (2011.01)
*H04L 29/08* (2006.01)

(52) U.S. Cl.
CPC ....... *H04N 21/23439* (2013.01); *H04N 5/765* (2013.01); *H04N 5/783* (2013.01); *H04N 21/2387* (2013.01); *H04N 21/47217* (2013.01); *H04N 21/6587* (2013.01); *H04L 67/02* (2013.01)

(58) Field of Classification Search
CPC ......... H04N 21/23439; H04N 21/2387; H04N 21/4587
USPC .................. 725/88, 131, 134, 141, 142, 151
See application file for complete search history.

(56) References Cited

U.S. PATENT DOCUMENTS

| 6,118,817 A * | 9/2000 | Wang | H04N 19/147 |
| | | | 375/240.03 |
| 2006/0026654 A1* | 2/2006 | An | H04N 7/165 |
| | | | 725/89 |
| 2007/0186228 A1* | 8/2007 | Ramaswamy | H04H 60/37 |
| | | | 725/14 |

(Continued)

Primary Examiner — Farzana Hossain
(74) Attorney, Agent, or Firm — Lorenz & Kopf LLP

(57) ABSTRACT

Systems and methods are described for providing trick play functions such as fast forward, rewind or slow motion during playback of streaming media content. Multiple sets of streamlets or other media files that represent the same media stream are encoded differently from each other (e.g., at different frame rates and/or frame directions), and each set of files is simultaneously maintained at a server. Files encoded at a first format are made available to the client device during regular playback, and files encoded at a different frame rate and/or a different direction of encoding are made available to support trick play.

17 Claims, 3 Drawing Sheets

(56) References Cited

U.S. PATENT DOCUMENTS

| | | | | |
|---|---|---|---|---|
| 2010/0195974 A1* | 8/2010 | Zheng | ................... | H04N 5/76 |
| | | | | 386/343 |
| 2011/0064384 A1* | 3/2011 | Otani | ................... | G11B 27/005 |
| | | | | 386/248 |
| 2011/0116772 A1* | 5/2011 | Kwon | .............. | H04N 21/23439 |
| | | | | 386/343 |

\* cited by examiner

SYSTEMS AND METHODS TO PROVIDE TRICK PLAY DURING STREAMING PLAYBACK

PRIORITY CLAIM

This application is a continuation of U.S. patent application Ser. No. 15/355,849 which was filed on Nov. 18, 2016 which is a continuation of U.S. patent application Ser. No. 13/027,220 which was filed on Feb. 14, 2011, which claims priority of U.S. Provisional Application Ser. No. 61/303,579 which was filed on Feb. 11, 2010 and is incorporated herein by reference.

TECHNICAL FIELD

The following discussion relates to streaming of media content over a network, and, more specifically, to trick play such as rewinding and fast-forwarding of streaming media content.

BACKGROUND

A wide variety of streaming audio, video and/or other media content is now available to consumers from any number of diverse sources. Often, streaming media content is maintained at a media server that provides the content to the consumer for playback via one or more wired or wireless telecommunications networks. So-called "Internet television", for example, is typically provided as a stream over the Internet or a similar network. Media streams are also used to provide other types of network-based media content, as well as live and pre-recorded broadcast television, content-on-demand and the like.

While streaming formats can be convenient for many applications, implementing "trick play" (such as fast-forward and rewind functions) is often relatively difficult within many conventional streaming environments. To "fast forward" a conventional media stream, for example, some streaming media players simply accumulate and decode future content that has been received but not yet played, and then discard those decoded media frames that are not needed. Conversely, to implement a rewind feature, the media player typically skips backwards in a buffer or cache of previously-received content to replay media frames that were previously decoded. The rewind feature is often limited, however, to previously-received content that is maintained in local storage at the player. If the user wishes to rewind past the content that remains in local storage, then prior content typically needs to be re-obtained from the server and re-decoded to continue the rewind. This can consume substantial amounts of memory, as well as significant processing resources. This relatively inefficient operation is especially troublesome for software decoders and the like that may have limited processing resources.

Further, the non-sequential and irregular nature of many popular media streaming formats can create challenges in identifying the particular media frames that are rendered during most conventional trick play functions. Some fast forward or rewind functions simply skip ahead (or behind) in the stream by locating and presenting certain "key frames" that carry information without dependencies to other frames (e.g., the I-frames of a conventional MPEG stream). These key frames, however, are not typically located at regular intervals or other predictable locations within the media stream. As a result, obtaining the key frames often involves scanning most, if not all, of the stream to locate the key frames, and then discarding the remaining decoded content.

It is therefore desirable to implement an effective trick play feature that is suitable for use in streaming media applications. Ideally, such a feature would reduce or eliminate the need for additional processing resources or special buffering, as well as the need to scan for key frames located at irregular intervals. These and other desirable features will become apparent from the subsequent detailed description and the appended claims, taken in conjunction with the accompanying drawings and this background section.

BRIEF SUMMARY

According to various embodiments, systems and methods are described for providing trick play functions such as fast forward, rewind or slow motion during playback of streaming media content. Multiple sets of streamlets or other media objects that represent the same media stream are encoded at different frame rates, and each set of objects is simultaneously maintained at a network-accessible service such as a media server or content delivery network (CDN). Objects encoded in a first manner are made available to the client device during regular playback, and objects encoded in a different manner (e.g., at a different frame rate and/or frame order) are made available to support trick play. Fast forward or rewind operations, for example, may be supported using streamlets or other files that provide a lower frame rate than the regular playback stream. For rewind functions, the frames may be arranged in reverse order within the media object so that frames occurring later in time during regular playback are arranged first in the rewind stream. Slow motion (in either a forward or a reverse direction) may be supported using streamlets or other objects that have a greater frame rate than the regular playback stream, as desired. Objects having different frame rates and/or reversed frames may be intermixed to support trick play functions as desired.

Various embodiments provide a method executable by a computer, media player and/or another client device to process a media stream received via a network. The method suitably comprises receiving a first portion of the media stream at the client device via the network, wherein the frames of the first portion of the media stream are encoded in a first manner; rendering the first portion of the media stream for playback; receiving a user instruction at the client device that indicates a trick play function; receiving a second portion of the media stream, wherein the frames of the second portion of the media stream are encoded in a different manner than the first portion of the media stream; and rendering at least some of the second portion of the media stream for playback to thereby perform the trick play function.

Other embodiments provide a method executable by a file server, content delivery system or other data processing system to provide a media stream to a client device via a network. The method suitably comprises maintaining a first set of files that collectively represents the media stream, wherein each of the first set of files is encoded at a first frame rate and wherein the first set of files is sequentially ordered according to a time index; simultaneously maintaining a second set of files that collectively represents the same media stream sequentially-ordered according to the same time index as the first set of files, wherein the second set of files is encoded at a second frame rate that is different from the first frame rate; sequentially providing files from the first set of files to the client device via the network during normal playback of the media stream; and providing files from the second set of files to the client device during a trick play operation.

Still other embodiments provide a data processing system that provides a media stream to a client device via a network. The data processing system suitably comprises an interface to the network, a database, and a media server. The database is configured to simultaneously maintain a first set of files and a second set of data files that each collectively represent the same media stream and that are each sequentially ordered according to a common time index. The media server communicates with the database and the interface, and is configured to sequentially provide files from the first set of files to the client device via the network during normal playback of the media stream and, in response to a user of the client device instructing a trick play operation, to provide files from the second set of files to the client device during the trick play operation.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to the various embodiments described herein, apparatus, methods and systems present trick-play media viewing experiences in a streamed content implementation. In accordance with at least one embodiment, a rewind and fast-forward viewing experience on a web-based streaming playback platform is described. Other embodiments may be used to implement broadcast television, video on demand, web television and/or any other applications as desired.

Figure 1:
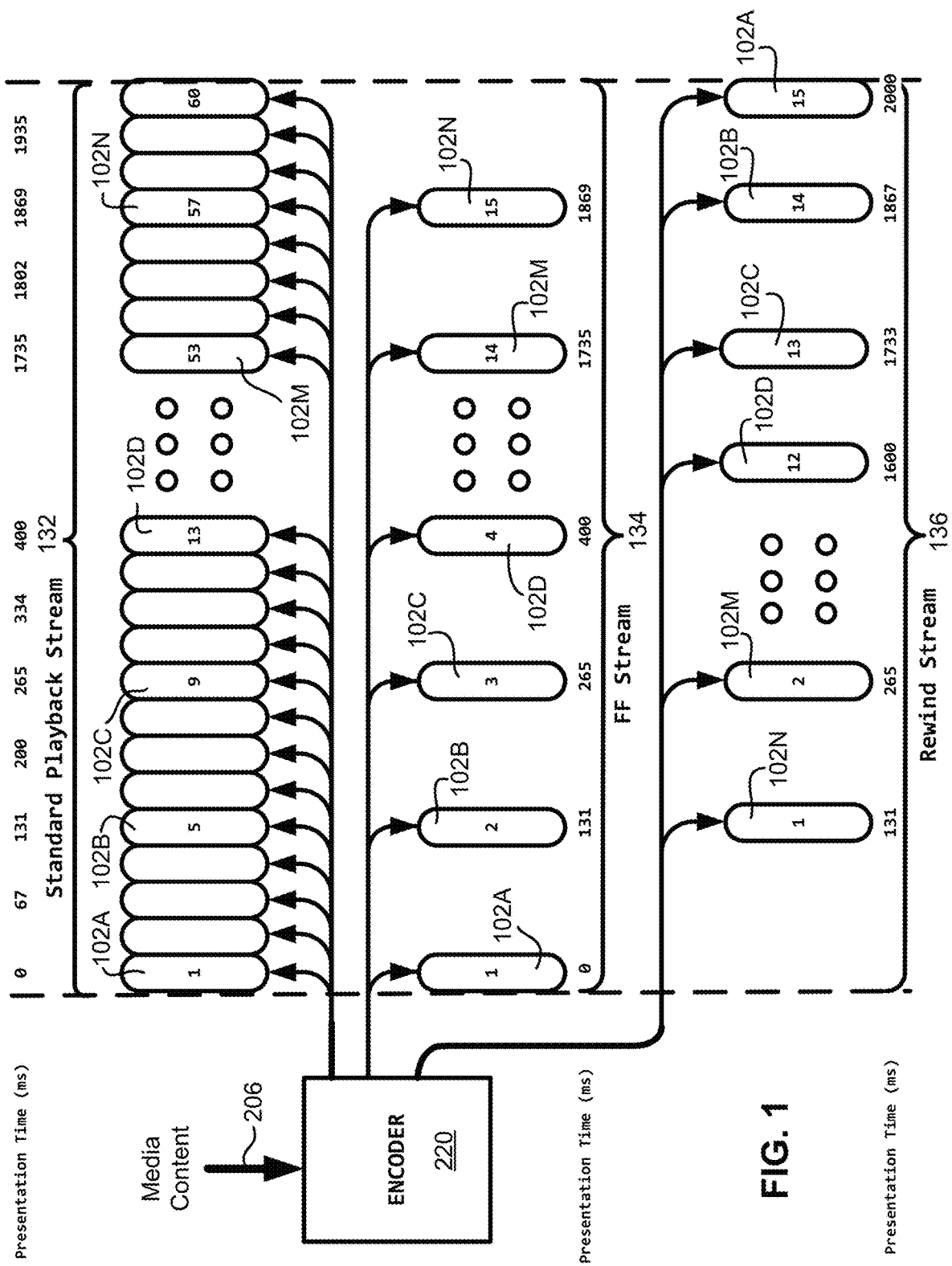
FIG. 1 illustrates one technique for generating a media stream suitable for trick play.

Turning now to the drawing figures and with initial reference to FIG. 1, an exemplary embodiment suitably represents a common portion of a media stream using two or more separate and differently encoded media content objects 132, 134, 136. Objects 132, 134, 136 may be encoded with different frame rates, for example, and/or with the various video frames encoded in reverse order to facilitate trick play operations. In the example of FIG. 1, the object 132 having a higher frame rate could be used to present the content during regular playback, whereas the objects having lower frame rate (e.g., objects 134 and 136 in this example) could be used to present the same content in a trick play mode in which fewer frames from the same portion of the media stream are presented to the viewer, but at an accelerated playback rate. Further, the various content frames in one or more objects (e.g., object 136 in FIG. 1) may be encoded in reversed order in comparison to other objects 132, 134 to facilitate more effective "rewind" operations when playback proceeds backwards in time. Similar concepts could be equivalently applied to present a forward and/or reverse "slow motion" stream using objects encoded with a higher frame rate, thereby allowing for greater frame resolution than would be otherwise available. Any number of media content objects 132, 134, 136 may be encoded at any number of different frame rates to support any number of faster, slower or equal playback speeds in either a forward or reverse direction, as desired.

In the example illustrated in FIG. 1, object 132 contains approximately sixty video frames 102 that provide about two seconds of video content (e.g., a frame rate of about 30 frames/second; the exemplary presentation times shown in FIG. 1 are based upon a 29.97 frame/second playback rate, although other rates could be equivalently used). Objects 134 and 136 are shown representing the same two seconds of media content as object 132 with about fifteen video frames 102, so the frame rate of objects 134 and 136 in this example is about one fourth that of object 132 (e.g., about 7.5 frames/second). Object 136 also shows the various frames 102 ordered in reverse sequence in comparison with objects 132 and 134 so that the frames occurring later in time during regular playback are decoded and presented first, thereby facilitating an a more efficient rewind function. Other embodiments could encode objects 132, 134 and 136 (as well as any number of additional objects representing the same portion of the media stream) to have different durations, frame rates and/or other parameters. It is not necessary that the forward and reverse streams have the same frame rates, nor is it necessary that the same number of forward and reverse streams be provided. Any number of additional or alternate streams having any number of different frame rates proceeding in either forward or reverse direction could be provided in any number of equivalent embodiments.

By selecting between the streams that include objects 132, 134 and 136, then, the frame rate of the media stream can be adapted to compensate for user changes in the playback speed. If the user wishes to advance (or rewind) the media stream at a faster than normal rate, conventional techniques would simply decode the full stream, but then present only a subset of the frames to so that the programming appears to move at a faster rate. Using FIG. 1 as an example, all sixty of the frames in object 132 could be presented within the two second time frame during normal playback. If the viewer wanted to "fast forward" through the content represented by object 132, one way to accomplish this would be to simply present the frames 102 (or a subset of the frames, such as the key frames) contained within object 132 within a shorter time period. If all the frames of object 132 were presented within a half second, for example, the program would appear to progress at a "4×" playback rate, with a frame rate that was similarly multiplied by a factor of four (i.e., 120 frames/second in this example). Receiving, decoding and rendering all of this data within this time frame, however, would typically require a relatively large amount of network bandwidth, as well as relatively powerful data processing resources on the client device.

Only a subset of the frames in object 132 would need to be presented during the accelerated playback (e.g., fast forward or rewind) to preserve the same effective frame rate experienced during regular playback. That is, the same effective frame rate experienced during regular playback could be preserved during 4× playback using only 25% of the frames contained within object 132. In most conventional implementations, however, the player still needs to identify the key frames that would be presented during accelerated playback, so it still needs to obtain the full content of the object in order to find and process the few frames that will be actually rendered. The extra frames in object 132 are ultimately discarded, but only after they have been transported and processed by the media player. Moreover, since the key frames are not necessarily spaced at regular intervals, key-frame-only playback can appear uneven and inconsistent to the viewer.

A more efficient approach would be to use a different object 134 or 136 that provides the same portion of the stream as object 132, but at a different frame rate that is more suitable for the current playback rate. If the user commands a "4×" playback speed in the forward direction, for example, object 132 could be replaced with object 134, which contains all of the needed frames to support the faster playback without degradation in frame rate. Object 134, despite having fewer frames than object 132, would nevertheless be able to provide an equivalent frame rate as object 132 during faster playback. Moreover, because object 134 contains fewer frames 102 than object 132, object 134 will typically require less network bandwidth for transportation and fewer processor resources for decoding. The particular parameters and values used in this example could be modified in any number of other embodiments; the frame rate could be increased or decreased as appropriate to provide a desired effective frame resolution for any number of different playback speeds, and/or any number of additional objects may be encoded to represent the same portion of the media stream at any number of different frame rates.

Similar concepts could be used to provide reverse-direction playback, as in a "rewind" function. In the example shown in FIG. 1, object 136 differs from objects 132 and 134 in that the various physical frames 102A-N are encoded in reverse temporal order. That is, frames that represent content appearing later in time during normal playback (e.g., frame 102N) are provided within object 136 before frames that would appear earlier in time during normal playback (e.g., frame 102A). By providing "later" frames earlier in the object 136, the frames that are displayed first during reverse playback are the first frames received by the decoder. The first frame received in object 136 (e.g., frame 102N in FIG. 1), for example, is the first frame presented during reverse playback. Since the decoder receives the frames 102A-N in essentially the same order that they will be rendered during reverse playback, the need to decode and cache additional frames 102A-N prior to rendering the reverse stream to the viewer is substantially reduced, if not eliminated. Further, the playback will be much smoother, since frames are provided at regular intervals, in comparison to techniques that render only key frames.

Different encoding of frame rate and/or frame direction may be combined as desired. In the example of FIG. 1, object 136 is shown to be encoded at a similar reduced frame rate as object 134 to facilitate faster playback speeds, albeit in an opposite direction as object 134. Other embodiments, however, may encode one or more reverse streams at a higher or lower frame rates to provide effective reverse playback at different speeds. An additional stream could be encoded at the same frame rate as object 132, for example, but in reverse frame order to facilitate effective reverse playback at the same speed as normal forward playback. Additional streams of higher or lower frame resolution reverse playback may be provided in any number of other embodiments.

In various embodiments, each media content object 132, 134, 136 is a streamlet, file or similar data object that represents a particular portion of the overall stream made available to the user. In such embodiments, each data object may be created to represent a particular portion of the original media stream that has a predetermined length of time, such as the two-second duration shown in FIG. 1. In other embodiments, the predetermined length of time may be in the range of between about approximately 0.1 and 8.0 seconds, for example, although other predetermined lengths may be equivalently used. Further, the media content in the object may have a unique time index in relation to the beginning of the media content contained in a stream. The various objects may be equivalently organized in a spatial manner (e.g., arranged and indexed according to a file size) or in any other manner.

Other embodiments may provide media objects that are not necessarily "chunked" or otherwise distributed as separate files, but that instead provide relatively continuous streams of media content in conjunction with a table or other metadata that identifies the locations of "key frames" or the like that are used in trick play. In such embodiments, the metadata would typically provide a common time or other index that allows for changing between continuous streams while preserving the continuity of the viewer experience. The various "objects" or "portions" of the media stream could therefore be identified through processing of the metadata even if separate files or streamlets were not available.

In various embodiments, multiple sets of media objects are appropriately generated using common space or time indexes so that the objects from different sets can be sequentially intermixed as the user commands different playback rates or directions of playback. That is, an object from a first set of objects may be followed by an object from a different set that has different encoding parameters, but that nevertheless provides the appropriate portion of the media stream in the manner expected by the viewer for the trick play operation. Switching between sets of discrete objects allows for responsive adaptation to network conditions, user instructions and/or the like while preserving visual continuity of the programming stream expected by the viewer. In the example presented in FIG. 1, replacing object 132 with object 134 or object 136 preserves visual continuity to the viewer, since objects 132 and 134 in this example are time indexed according to a common presentation time index, thereby ensuring that the content represented in objects 132, 134 and 136 represents the same portion of the overall media content, albeit at a different frame rate and/or direction.

Figure 2:
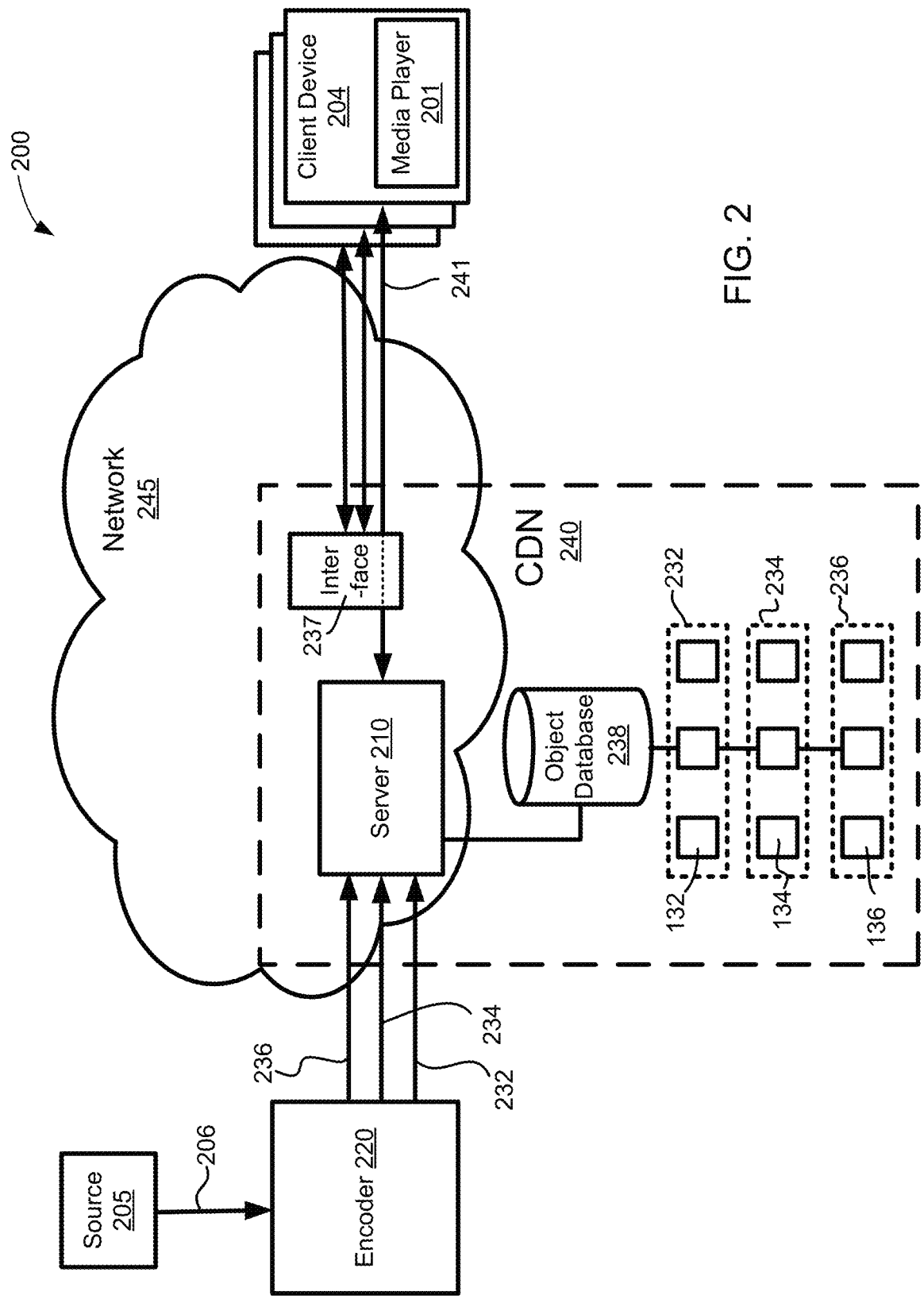
FIG. 2 is a schematic block diagram illustrating one embodiment of a computing environment in which trick play of a media stream may be performed.

With reference now to FIG. 2, an exemplary computing environment 200 to make a media stream available to one or more client devices 204 via a network 245 suitably includes a communications interface 237, a database 238 that stores two or more sets 232-236 of media objects, and a media server 210 that sequentially provides the various particular objects from various sets 232-236 to client devices 204 via network 245, as desired. The computing environment 200 may also include a media content source 205 and an encoder 220, as desired, although other embodiments may perform the encoding function entirely separately from the content delivery function.

The content server 210 and client devices 204 are able to communicate using one or more data communications networks 245 such as the Internet and/or one or more common local area networks (LAN), personal area networks (PAN), campus area networks (CAN), metropolitan area networks (MAN), wide area networks (WAN), wireless local area networks, cellular networks, virtual local area networks, any combination of the foregoing, and/or the like. Other embodiments may allow communications between content server 210 and client devices 204 in any other manner.

Client devices 204 are any suitable devices configurable to receive audio, video and/or other media content from the media server 210 over one or more streaming connections 241. Examples of client devices 204 could include (without limitation) client workstations, servers, personal computers, portable electronic devices, mobile telephones, personal digital assistants, video game systems, entertainment systems, set-top boxes, digital receivers, digital televisions, time or place shifting devices, and/or other electronic devices as desired. In some implementations, client device 204 may be implemented using a general purpose computing system that executes software or firmware to provide a media player application 201, as appropriate. The media player 201 may be a piece of software that plays the media content (e.g., displays video and plays audio), such as any sort of standalone software application, web browser plug-in, combination of browser plug-in and supporting web page logic, or the like.

FIG. 2 shows a content source 205 that provides a media stream 206 to an encoder 220, as appropriate. In the embodiment depicted in FIG. 2, the media source 205 may be a publisher server, a publisher content repository, a creator or distributor of media content, and/or any other source of audio, video or multimedia content as desired. For example, if the media content 206 to be streamed is a broadcast of a television program, the source 205 may be a server affiliated with a television or cable network channel such as the ABC® channel, or the MTV® channel. The publisher may transfer the media content 206 over the Internet or another network to the encoder 220, which is appropriately configured to receive and process the media content 206 to create any number of encoded streams 232, 234.

Each encoded stream 232, 234, 236 suitably represents a set of media objects (e.g., objects 132, 134, 136) each having different frame encoding parameters (e.g., frame rate, frame direction and/or the like). Each of these streams 232-236 may be stored in database as a set of streamlets or similar objects that collectively represent a copy of the original media content 206. Generally speaking, each of the different sets 232-236 of objects will share a common time or other index so that objects from different sets 232-234 may be intermixed with each other when the objects are made available to client devices 204, thereby allowing the content stream to adapt to network conditions, user inputs and any other factors as appropriate.

The various objects may be stored as one or more files or sets of separate files on any one or more of content servers, web servers, database servers, cache servers, proxy caches, or other devices on the network, such as found in a conventional content delivery network (CDN) 240. In various embodiments, the objects are stored within database 238, as desired, for subsequent retrieval by media server 210 so that the objects can be made available to client devices 204.

Interface 237 is any sort of interface card, server and/or other computing hardware that is capable of facilitating communications between media server 210 and one or more client devices 204. In various embodiments, media server 210 may be implemented with a conventional computer server (including any conventional computing hardware, any sort of virtual "cloud-based" server, and/or the like), with interface 237 facilitating network communications between media server 210 and one or more client devices 204. Other embodiments may allow client devices 104 to retrieve media objects from more than one media server 210 within CDN 240, as desired. Interface 237, then, may be a simple interface card useable by a particular server, or, equivalently, an interface server that may provide load balancing, routing, authorization and/or authentication, firewall services, and/or other features as desired.

Although one connection 241 to media server 210 and/or CDN 240 has been illustrated in FIG. 2 for each client device 204, each connection 241 may logically represent multiple network connections to the CDN 240. In one embodiment, each client device 204 is able to establish multiple Transport Control Protocol (TCP) or other connection 241 to the CDN 240 via network 245. In another embodiment, the media content is stored in multiple CDNs. Content may be stored, for example, in the origin servers associated with each of the multiple CDN. The CDN 240 may be used for the purpose of improving performance, scalability, and cost efficiency to the end users (e.g., viewers) by reducing bandwidth costs and increasing global availability of content. In other embodiments, other techniques may be used to make the media content available to the media players from the origin servers, such as peer-to-peer networks, or the like. Also, although media server 210 has been illustrated as being within the CDN 240 in FIG. 2, the server 210 may equivalently reside outside of the CDN 240 and still be associated with the CDN 240.

As described above, each trick play stream 234, 236 represents a copy of the original media stream at a different frame rate and/or direction than the regular playback stream 232, as described above. Each of these representations is stored at media server 210, database 238 and/or another part of CDN 240, as appropriate. The various streams 232-246 may be stored as separate files or other objects that are independently requestable, deliverable and/or playable by the client device 204. Each of the encoded objects may be stored in one or more content servers 210, on the web servers, proxy caches, edge caches of the CDN 240, and may be separately requested and made available to the client device 204.

The various concepts described herein may be implemented using client-driven, server-driven, and/or any combination of client and/or server-driven streaming implementations. In various embodiments, the server 210 typically selects which content objects to send to the client device 204 based upon user inputs and/or other information provided by the client device 204. In other embodiments, the client device 204 determines which particular content objects to request from the content server 210. Client devices 204 may, for example, request separate objects from media server 210 using conventional protocols such as the hypertext transport protocol (HTTP) or the like. One type of request that could be used in "pull" scenarios is a HTTP "GET" or similar request, although other embodiments may use any number of other mechanisms to request streamlets or other objects from server 210.

Various embodiments are therefore able to make the media stream available using a sequence of objects 132, 134, 136. Objects are selected by either the client 204 or the server 210, and the selected objects are sequentially provided from server 210 to client 204 via network 245. In many embodiments wherein the client device 204 initiates requests for objects, a conventional web-type file server can be used to retrieve and serve the requested objects, thereby reducing the need for specialized servers to support specialized media streams while preserving the ability to perform trick play functions as the stream is being provided.

Other embodiments may use different techniques for providing media content over network 245. Some embodiments, for example, may store the content in a single file that is divided into portions that can be cached in CDN 240 and/or requested using HTTP range requests or the like. Other embodiments may provide an adaptable content stream using RTSP or other protocols, as desired. In some implementations, RTSP or other protocols may be encapsulated within or otherwise transmitted via TCP, UDP, RTP, HTTP and/other transport protocols to facilitate delivery through firewalls, or for any other purposes. Again, the use of standard protocols such as HTTP or the like often reduces or eliminates the need for network administrators to configure firewalls to recognize and pass-through network traffic for specialized protocols. Any number of equivalent variations could be formulated.

Any number of additional trick play streams 234, 236 can be created by encoder 220 in a similar manner as the pull-based configuration described above. The additional encoded content file(s) can be stored as appropriate, such as in data base 238. Objects may be selected at player 201 or another portion of client device 204, by logic executing within server 210, or in any other location as desired. The selected objects may then be provided in any manner from server 210 to the client device 204 for playback. The various trick play concepts described herein could therefore be applicable to either push or pull concepts, or other network delivery techniques that are based upon client-side, server-side, or any combination of client and server-side logic.

Many embodiments may be further enhanced with adaptive streaming capabilities to adjust the quality of the regular or trick play stream in response to network conditions, player capabilities or other factors as desired. To implement adaptive streaming, the encoder 220 additionally encodes the normal playback stream 232 and/or one or more of the trick play streams 234, 236 at several different quality profiles. The quality profiles each represent different parameters such as how the stream is to be encoded, the width and height of the image (i.e., image size), video bit rate (i.e., rate at which the video is encoded), audio bit rate, audio sample rate (i.e., rate at which the audio is sampled when captured), number of audio tracks (e.g., mono, stereo, or the like), frame rate (e.g., frame per second), staging size, or the like.

Various client devices 204 may process different quality levels of the same media content 206, depending upon the application, preferences of the viewer, device capabilities, network throughput, or any other factors. Some implementations may make different quality profiles available to the client device 204, as desired. In such embodiments, different media players 201 may receive the same portion (e.g., same time index) of the media content, but at different quality levels. For example, one media player 201 may request a streamlet having HD quality video, since the computing device of the requesting media player has sufficient computational power and sufficient network bandwidth, while another media player 201 may request objects having lower quality, since its computing device may not have sufficient network bandwidth, for example. In one embodiment, the media player 201 shifts between quality levels at the portion boundaries by requesting portions from different copies (e.g., different quality streams) of the media content, as described in U.S. Patent Application Publication No. 2005/0262257, filed Apr. 28, 2005. Alternatively, the media player 201 requests the portions using other techniques that would be appreciated by those of ordinary skill in the art having the benefit of this disclosure. The various quality parameters used in encoding may be combined as desired, and used to supplement the various types of frame encoding described herein. For example, at least one stream 242 may be encoded that has a relatively low frame rate to support trick play but that has a relatively high bit rate to maintain image quality even during trick play operations. Any number of different streams having any variety of parameters may be encoded and otherwise processed in various embodiments.

To implement trick play features, then, media objects having an appropriate frame rate and/or frame direction to support the desired playback are provided from the server 210 to the media player 201 or another component of client device 204. The particular streamlets or other objects may be selected and requested by the media player 201 (e.g., using an HTTP "GET" instruction) in some implementations, while other implementations may respond to user inputs or other appropriate information to provide objects that are selected at server 210, at database 238, and/or elsewhere in environment 200 to client device 204 as desired.

In various embodiments, the playback of the various streams can be varied and controlled to support trick play at any playback speed, such as at 3×, 0.5×, 10×, 7.5, or any other multiple. The media player 201 suitably renders the frames at the appropriate intervals to achieve the desired playback rate. Because the playback rate is variable, the player can compute and change the rate to be accelerating or decelerating in a continuous manner in many implementations. In other embodiments, the encoder encodes two or more special streams at different lower frame rates (e.g., four frames/second and eight frames/second). The media player 201 (or server 210, as appropriate) may compute which stream to use to generate the smoothest rendering of the desired rate multiple without increasing load on the CPU or decoding hardware. Further, frames may be encoded in forward or reverse order, as described herein, to support reverse playback as desired.

Figure 3:
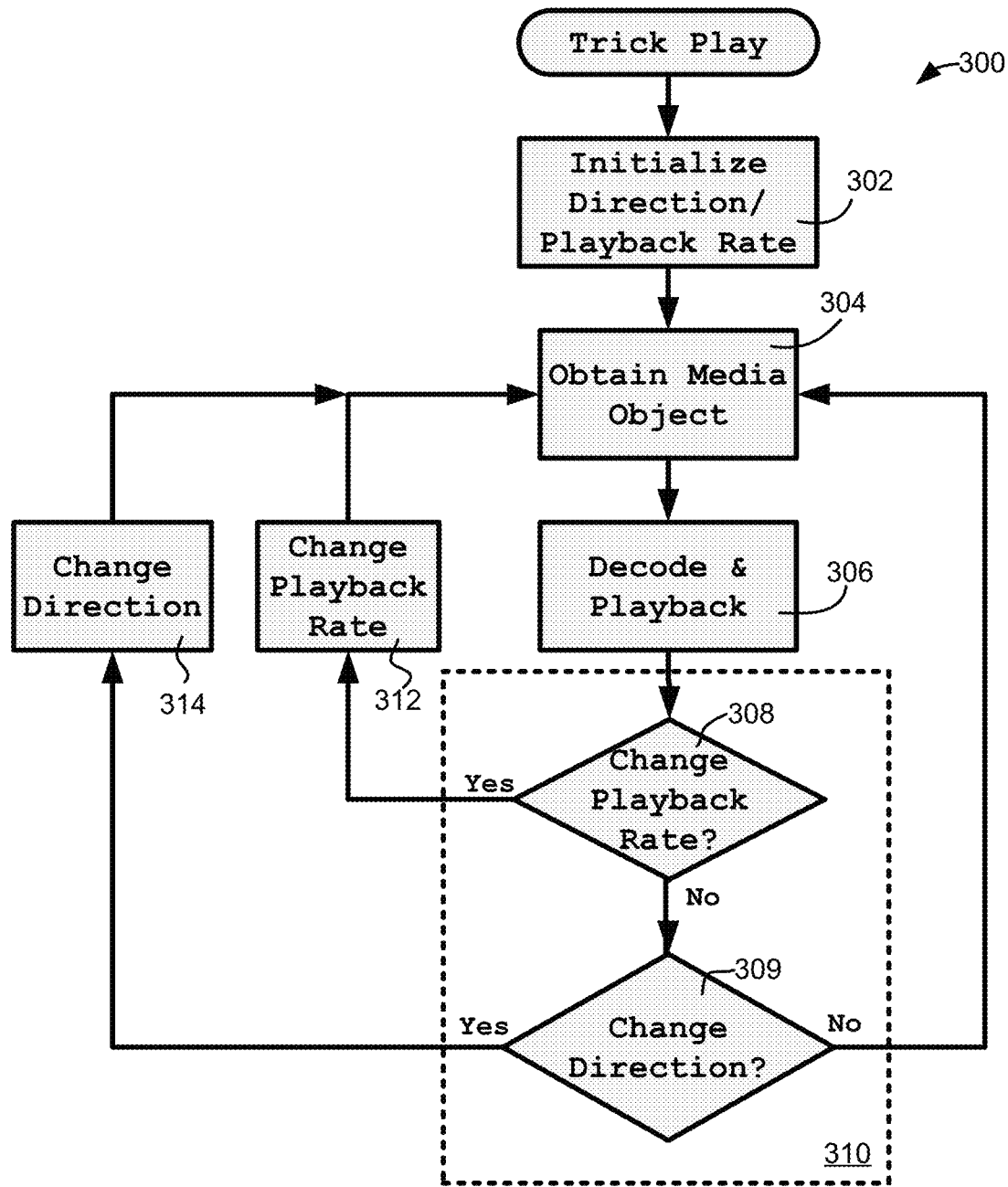
FIG. 3 is a flowchart of an exemplary process for processing trick play operations.

FIG. 3 is a flowchart of an exemplary process 300 that could be used in some embodiments to implement trick play features such as fast forward, rewind and/or slow motion playback (in either forward or reverse direction) of a media stream. The various functions shown in FIG. 3 may be implemented in software or firmware that can be store in any non-transitory medium (e.g., memory or mass storage within client device 204) and that can be executed by any sort of microprocessor, microcontroller, digital signal processor or other programmable logic. Various implementations may implement most, if not all, of process 300 within client device 104, whereas other implementations may implement several of the functions (e.g., functions relating to selection of a particular object or object stream) with in media server 210 or another portion of CDN 240. The particular means used to implement the various functions shown in FIG. 3 may therefore vary from embodiment to embodiment.

Process 300 suitably includes the broad functions of initializing a playback rate and direction of playback (function 302), obtaining a media object that corresponds to the playback rate and direction (function 304), decoding and playing back the obtained media object (function 306), and responding to a user input 310 directing a trick play feature to adjust the playback rate (functions 308, 312) or playback direction (functions 309, 314) as desired. The basic functions shown in FIG. 3 may be modified, supplemented or differently organized in any logical, temporal or other manner, as desired.

As noted above, trick play features may be implemented and/or enhanced through the use of streamlets or other media objects 132, 134 that have different characteristics suitable for the particular playback parameters desired by the viewer or other user. Note that streamlets or similar objects 132, 134, 136 from various streams or sets 232, 234, 236 may be sequentially obtained and intermixed with each other based upon a temporal or spatial index. Objects may be sequentially obtained in a forward or reverse direction to support playback at any speed and in either direction, thereby allowing for a very high level of user control.

Playback may be initially performed at any rate, and in a forward or reverse direction (function 302). In some embodiments, playback may initialize with a "freeze frame" or still image, as desired. Function 302 suitably involves setting initial parameters for obtaining appropriate media objects 132, 134 as desired.

Media objects 132, 134 may be obtained in any manner (function 304). In various embodiments, client device 104 suitably obtains an appropriate streamlet or other media object from server 210 as appropriate. Such requests may be made using, for example, HTTP or similar protocols to obtain file-type objects from a conventional CDN or other web-type server accessible over the Internet or another network. Equivalently, objects may be provided to the client device 204 using RTSP or other streaming protocols. In various embodiments, streamlets or similar objects 132, 134, 136 may be identified by client device 204 and/or media server 210 using any sort of naming or file identification format. Objects 132, 134, 136 may be located by name or uniform resource locator (URL) within database 238, for example. In some embodiments, the name of each object 132, 134, 136 is determined at least in part from the relative time or spatial index value corresponding to the object, and/or from the stream or set 232-236 that includes the particular object 132, 134, 136. Other embodiments may identify objects through a data table or other structure, through metadata that identifies relative locations in one or more continuous data streams, or in any other manner.

Still other embodiments may select and obtain the appropriate objects using server-based logic as described above, or the like. Particular media objects are selected by the client 204 and/or by the server 210 in any manner. The selected objects are then provided from server 210 to client 204 using any sort of file based (e.g., delivery of streamlets or other files in response to HTTP GET requests), stream based (e.g., RTSP), and/or other delivery techniques.

The received media objects are decoded and rendered for playback as desired (function 306). Playback is typically performed by media player 201 or the like executing on client device 204 and using conventional techniques in accordance with the then-current parameters governing the speed and/or direction of playback. Rendering the media content for playback could involve, in various embodiments, presenting the decoded content on a display associated with the client device 204 itself (e.g., a display on a computer system, mobile phone or the like). Alternately, rendering the content for playback may involve providing signals representing the content to a television or other external display (e.g., a television receiver or set top box could render content by providing appropriate output signals to a television or other display). Other ways of "rendering" content for playback may consider placeshifting or other remote display concepts, as desired.

If the user provides an input 310 to change the playback of the media stream, then streamlets or other media objects 132, 134, 136 having different parameters may be obtained during subsequent object requests or pushes, and/or playback parameters may be adjusted to accommodate the available object sets as desired.

If the viewer wishes to change the playback rate (function 308), for example, then media objects 132, 134 encoded at a more appropriate frame rate for the new playback speed (function 312) may be obtained during subsequent object requests. As playback speed is increased, it may be desirable to obtain a streamlet or other media object 134, 136 that has a lower frame rate for an equivalent period of time. Conversely, if playback speed is decreased (e.g., to support a slow motion feature), then objects with the same number or additional frames may be desirable to maintain the effective frame rate through the slower playback speed. If a media object 132, 134, 136 having the optimal or particularly-requested frame rate is not available, then subsequent requests may simply choose an object with a frame rate that more closely approximates the desired rate, but that nevertheless provides sufficient data to maintain image consistency. If the viewer requests an 8× playback speed but only 1× and 4× streams are available, for example, then the 4× stream may be selected, with subsequent playback discarding the unused frames. Although this may not be as efficient as receiving a media object previously encoded at the requested rate, it will still conserve network bandwidth and processing resources in comparison to processing the 8× playback based solely upon the 1× media stream. Playback rates may be smoothly transitioned from one rate to another, or otherwise controlled by the user as desired.

If the user input additionally or alternately changes the desired direction of playback (function 309), then reverse-encoded streamlets or other media objects 136 can still be retrieved from the server 210 in sequence according to the time, space or other index; the direction of the sequence is simply reversed (function 314). Rewind functions, for example, could be processed by retrieving objects from reverse stream 236 in numerical sequence, but moving backwards in time (e.g., progressing toward time zero, or the beginning of the programming). In embodiments wherein the objects 136 are streamlets or similar discrete files requested from a server 210, the process for receiving prior objects is relatively convenient, since files can simply be requested in numerical or other indexed order. This conveniently allows for rewind functions that are not typically constrained to previously decoded and cached content, as was typical in many conventional streaming media implementations. In some situations, reverse playback for relatively short periods of time may be possible using only a single streamlet or other object, thereby reducing or eliminating the need to obtain multiple objects from the server 210.

Further, in embodiments where objects 136 having reverse-order encoded frames are available, the frames 102 are received in essentially the same order in which they are decoded and rendered. Rather than decoding and caching frames so that the last-received frame can be played first, then, the frames 102 in each object 136 are simply played in essentially the same order that they are received. This can substantially reduce memory consumption and processor loading, thereby greatly improving performance (or enabling rewind features on devices that would not otherwise have such capability).

The general process of obtaining media objects (function 304), rendering the obtained media objects for playback (function 306), and adjusting the playback in response to user inputs 310 can continue through any number of iterations as desired. In embodiments wherein common indexing is shared across separate streams having different encoding parameters, objects from any number of different streams can be intermixed in sequence to maintain image continuity to the viewer, as described above. This could allow for smooth acceleration or deceleration of forward or backward playback speed, for example, thereby providing a very pleasing user experience while preserving bandwidth and computing resources.

Further, because the received stream is provided in a manner that is selected based upon the desired playback mode (e.g., fast/slow, forward/reverse), the processing to decode and render the received stream is greatly simplified. The decoder simply decodes the various frames in essentially the order received, without substantial regard to the playback speed or direction, since the received media object 132, 134, 136 was encoded specifically to provide the playback mode commanded by the user.

The various techniques described herein may enable any number of convenient interfaces and other features for the viewer. Various embodiments could respond to inputs provided at an actual or virtual "jog dial", rotary control, slider-type and/or other input to smoothly adjust the playback speed in a manner that simulates varying the speed of a video tape machine or similar analog device. In such embodiments, continuously variable rate changes (or changes or at a selected multiple of the rate) can be done regardless of the initial playback rate that was in use before the trick play. A user might begin with the video playback paused, for example, and then proceed to search forward or backward to locate desired content. The user may then return to the zero-velocity state when the user finds what he or she wants.

Fast forward and slow motion effects can be similarly controlled by a dial in a hardware or software user interface. The farther the user turns the dial to forward or reverse, for example, the faster or slower the playback rate produced on the display. The playback rate may be appropriately varied in a continuous smooth manner. In some implementations, the speed could return to the initial steady-state playback rate (e.g., paused, regular playback, or the like). In one embodiment, a slider or rotary control could be implemented in a PC player interface to simulate spring loaded mechanical controls that are biased toward a zero-effect position when the user releases the control. Various embodiments therefore provide a very pleasing viewer experience that lets the user control playback at his or her own pace. These exemplary embodiments provide better usability and attractiveness of playback experiences in the streaming context, and provide playback experiences that are similar to the traditional TV playback experiences. Other embodiments may provide different features, including other types of user interfaces as appropriate.

In the preceding description, numerous details are set forth. It will be apparent, however, to one of ordinary skill in the art having the benefit of this disclosure, that many different embodiments may be practiced without these specific details. In some instances, well-known structures and devices are shown in block diagram form, rather than in detail, in order to avoid obscuring the more relevant details.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "receiving," "encoding," "generating," "splitting," "processing," "computing," "calculating," "determining," "displaying," or the like, may refer to the actions and processes of a computer system, or similar electronic data processing system, that manipulates and transforms data represented as physical (e.g., electronic) quantities within the computer system's registers and memories into other data similarly represented as physical quantities within the computer system memories or registers or other such information storage, transmission or display devices.

Various embodiments may also relate to an apparatus for performing the operations herein. This apparatus may be specially constructed for the required purposes, or it may comprise a general-purpose computer system specifically programmed by a computer program stored in the computer system. Such a computer program may be stored as software or firmware in source or object code form in any non-transitory computer-readable storage medium, such as, but not limited to, any type of disk including floppy disks, optical disks, CD-ROMs, and magnetic-optical disks, read-only memories (ROMs), random access memories (RAMs), flash memory, EPROMs, EEPROMs, magnetic or optical cards, or any type of media suitable for storing electronic instructions.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method executable by a client device to process a media stream of media content that is received via a network, the method comprising:
   requesting a first portion of the media stream by the client device transmitting a first HTTP GET request via the network, wherein the first portion of the media stream is encoded with a predetermined duration of the media content with a first number of video frames;
   rendering the video frames of the first portion at a first frame rate by the client device to thereby playback the first portion of the media stream;
   receiving a user instruction at the client device to perform a trick play function that adapts the playback speed of the media stream;
   in response to the user instruction to adapt the playback speed of the media stream, the client device transmitting a second HTTP GET request via the network to thereby request a second portion of the media stream, wherein the second portion is encoded with the same predetermined duration of the media content as the first portion with a second number of video frames that is different than the first number of video frames used to encode the first portion; and performing the trick play function to adapt the playback speed of the media stream by the client device rendering the frames of the second portion so that the predetermined duration of the media content represented by the second portion is rendered over a different period of time than the same predetermined duration of the media content represented by the first portion without degradation of the first frame rate.

2. The method of claim 1 wherein the number of frames contained in the first portion is greater than the number of frames contained in the second portion.

3. The method of claim 1 wherein the trick play function is a rewind function, and wherein the frames of the second portion are encoded in reverse order in comparison to the first portion.

4. The method of claim 1 wherein the first portion and the second portion are represented by separate media files identified by a shared time index and wherein the separate media files representing the first and second portions of the media stream are requested according to the shared time index.

5. The method of claim 1 wherein the trick play function is a fast forward function, and wherein the first portion is encoded with more video frames than the second portion.

6. The method of claim 5 wherein the first and second portions are represented by separate media files identified by a shared time index, and wherein the shared time index of the second data file follows the shared time index of the first data file to indicate a subsequent portion of the media content having the predetermined duration, and wherein the media file representing the first portion contains more video frames than the media file representing the second portion encoded at the lower frame rate even though both data files represent the same duration of the media stream.

7. The method of claim 1 wherein the first and second HTTP GET requests are transmitted by the client device to a content delivery network (CDN) on the network.

8. A method executable by a data processing system to provide a media stream that represents a media program to a client device via a network, the method comprising:

maintaining a first series of objects that collectively represents the media stream, wherein each of the first series of objects is sequentially ordered according to a time index so that each of the first series of objects represents a predetermined duration of the media program that is encoded at a first frame rate;

simultaneously maintaining a second series of objects that collectively represents the same media stream sequentially-ordered according to the same time index as the first set of files, wherein each of the second series of objects represents the same predetermined duration of the media program that is encoded at a second frame rate that is different from the first frame rate so that the second series of objects represents the same portions of the media program as the first series of objects but with different numbers of video frames;

responding to first HTTP GET requests received from client devices via the network by sequentially providing objects from the first series of objects to the client device via the network during normal playback of the media stream to thereby allow the client device to render the media stream at a playback frame rate; and responding to second HTTP GET requests received from client devices via the network by sequentially providing objects from the second series of objects to the client device during a trick play operation in which the playback speed of the media stream is altered to thereby allow the client device to render the different number of video frames of the second series at the same playback frame rate as the first series so that the predetermined duration of the media program represented by the second series of objects is rendered over a different period of time to thereby adapt the playback speed of the media program without degradation in the frame rate.

9. The method of claim 8 wherein the objects from the first series of objects are sequentially provided according to the time index in a first direction during the normal playback of the media stream, wherein the trick play operation is a rewind operation, and wherein the objects provided from the second series of objects are sequentially provided according to the time index in a second direction opposite the first direction during the rewind operation.

10. The method of claim 9 wherein each of the second series of objects is encoded such that frames containing content occurring later in time during normal playback of the media stream are positioned for decoding before frames that occur later in time during normal playback.

11. The method of claim 9 wherein the objects are independently requestable by the client device.

12. The method of claim 9 wherein the objects are separate files that are independently requestable by the client device.

13. A data processing system that provides a media stream of media content to a client device via a network, the data processing system comprising:

an interface to the network;

a database configured to simultaneously maintain a first series of objects and a second series of objects that each collectively represent the same media stream and that are each sequentially ordered according to a common time index, wherein each of the second series of objects represents a same predetermined duration of the media content as a commonly-indexed object of the first series of objects, but wherein the second series of objects is encoded at a different frame rate from the first series of objects so that the second series of objects represents the same predetermined duration of the media content with a different number of video frames from the first series of objects; and a file server in communication with the database and the interface, wherein the file server is configured to respond to first HTTP GET requests by providing objects from the first series of objects to the client device via the network during normal playback of the media stream to thereby permit the client device to render video frames of the first series of objects for playback at a playback frame rate, and, in response to second HTTP GET requests received from the client device via the network representing a trick play operation that adapts a playback speed of the media stream, to provide objects from the second series of objects having the different frame rate to the client device during the trick play operation to thereby permit the client device to perform the trick play operation by rendering the different number of video frames in the second series of objects for playback at the same playback frame rate as the first series of objects so that the predetermined duration of the media program represented by the second series of objects is rendered over a different period of time to thereby adapt the playback speed of the first media program without degradation in the playback frame rate during the trick play operation.

14. The data processing system of claim 13 wherein the file server is configured to sequentially provide the objects from the first series of objects according to the common time index in a first direction during the normal playback of the media stream, wherein the trick play operation is a rewind operation, and wherein the files provided from the second series of objects are sequentially provided according to the common time index in a second direction opposite the first direction during the rewind operation.

15. The data processing system of claim 13 wherein the first and second series of objects have different frame rates so that the number of frames contained in first series of objects is different than the number of frames contained in the second series of objects.

16. The data processing system of claim 13 wherein the objects are independently requestable by the client device.

17. The data processing system of claim 13 wherein the objects are separate files that are independently requestable by the client device.

* * * * *